(12) United States Patent
Lee

(10) Patent No.: US 12,066,820 B2
(45) Date of Patent: Aug. 20, 2024

(54) INTEGRITY INDEX DETECTING METHOD FOR DEVICE BY MEANS OF CONTROL OUTPUT SIGNAL

(71) Applicant: ITS CO., LTD., Ulsan (KR)

(72) Inventor: Young Kyu Lee, Ulsan (KR)

(73) Assignee: ITS CO., LTD, Ulsan (KR)

( * ) Notice: Subject to any disclaimer, the term of this patent is extended or adjusted under 35 U.S.C. 154(b) by 341 days.

(21) Appl. No.: 17/558,778

(22) Filed: Dec. 22, 2021

(65) Prior Publication Data

US 2022/0113712 A1 Apr. 14, 2022

Related U.S. Application Data

(63) Continuation of application No. PCT/KR2019/017643, filed on Dec. 12, 2019.

(30) Foreign Application Priority Data

Jun. 25, 2019 (KR) ........................ 10-2019-0075794

(51) Int. Cl.
*G05B 23/02* (2006.01)

(52) U.S. Cl.
CPC ..... *G05B 23/0221* (2013.01); *G05B 23/0235* (2013.01); *G05B 23/0237* (2013.01); *G05B 23/0262* (2013.01); *G05B 23/0267* (2013.01)

(58) Field of Classification Search
CPC ............ G05B 23/0221; G05B 23/0235; G05B 23/0237; G05B 23/0262; G05B 23/0267
See application file for complete search history.

(56) References Cited

U.S. PATENT DOCUMENTS

| 9,100,301 B2 * | 8/2015 | Berger ................ H04L 41/0846 |
| 9,983,575 B2 * | 5/2018 | Nixon ................ G05B 23/0267 |
| 10,160,553 B2 * | 12/2018 | Ward .................... B64D 45/00 |
| 10,235,853 B2 * | 3/2019 | Kurella ............ G08B 13/19682 |
| 10,481,595 B2 * | 11/2019 | Cruz .................. G05B 23/0216 |
| 2014/0039833 A1 * | 2/2014 | Sharpe, Jr. ......... G05B 19/4184 702/183 |

(Continued)

FOREIGN PATENT DOCUMENTS

| KR | 10-1543636 | 2/2014 |
| KR | 10-1643599 B1 | 7/2016 |

(Continued)

*Primary Examiner* — Thomas D Alunkal
(74) *Attorney, Agent, or Firm* — NKL Law; Byungwoong Park

(57) ABSTRACT

Disclosed is an integrity index detecting method for a device by means of a control output signal including an integrity information collecting step S10 of measuring and collecting a time interval between a control output signal and a subsequent control output signal; a defect information collecting step S20 of measuring and collecting a time interval between a control output signal and a subsequent control output signal; a setting step S30 of setting an integrity reference value and a defect reference value for the time interval between the control output signals; a detecting step S40 of measuring and collecting the time interval value between a control output signal and a subsequent control output signal; and an outputting step S50 of outputting the integrity index value detected in the detecting step S40 to provide the integrity index value to the manager.

11 Claims, 14 Drawing Sheets

(56) References Cited

U.S. PATENT DOCUMENTS

2014/0201571 A1* 7/2014 Hosek .................. B25J 9/1674
714/26
2019/0099886 A1* 4/2019 Chattopadhyay .... G05B 23/024

FOREIGN PATENT DOCUMENTS

| KR | 10-2019-0029749 A | 3/2019 |
| KR | 10-2012-0113076 B1 | 10/2021 |

* cited by examiner

[Fig. 1]
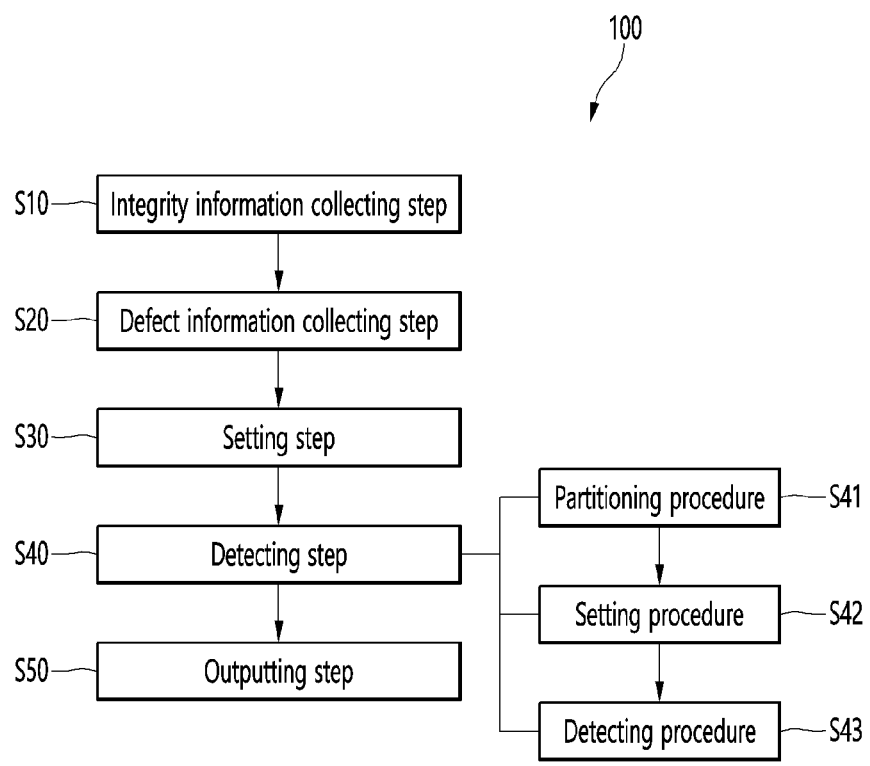

[Fig. 2]
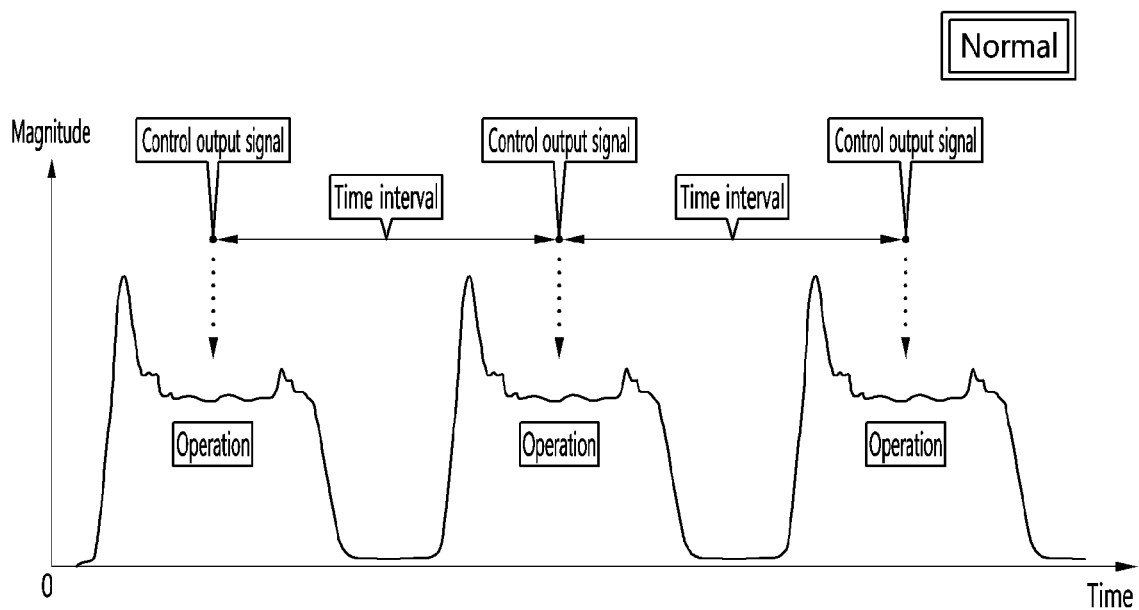

[Fig. 3]
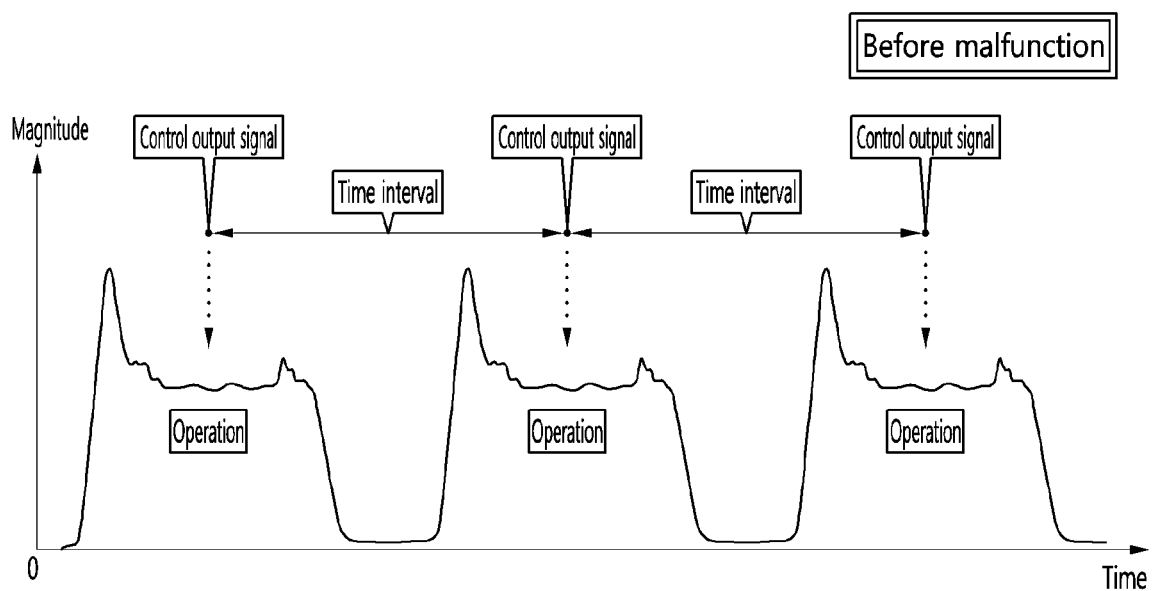

[Fig. 4]
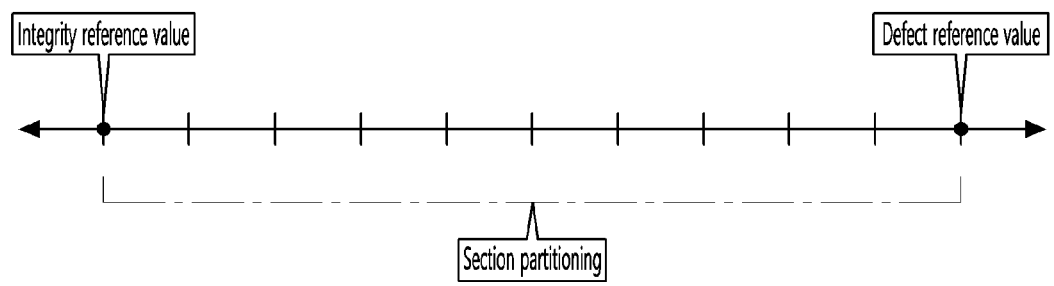

[Fig. 5]
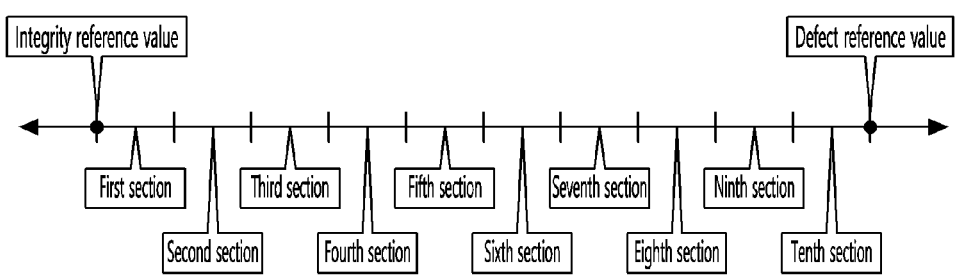

[Fig. 6]
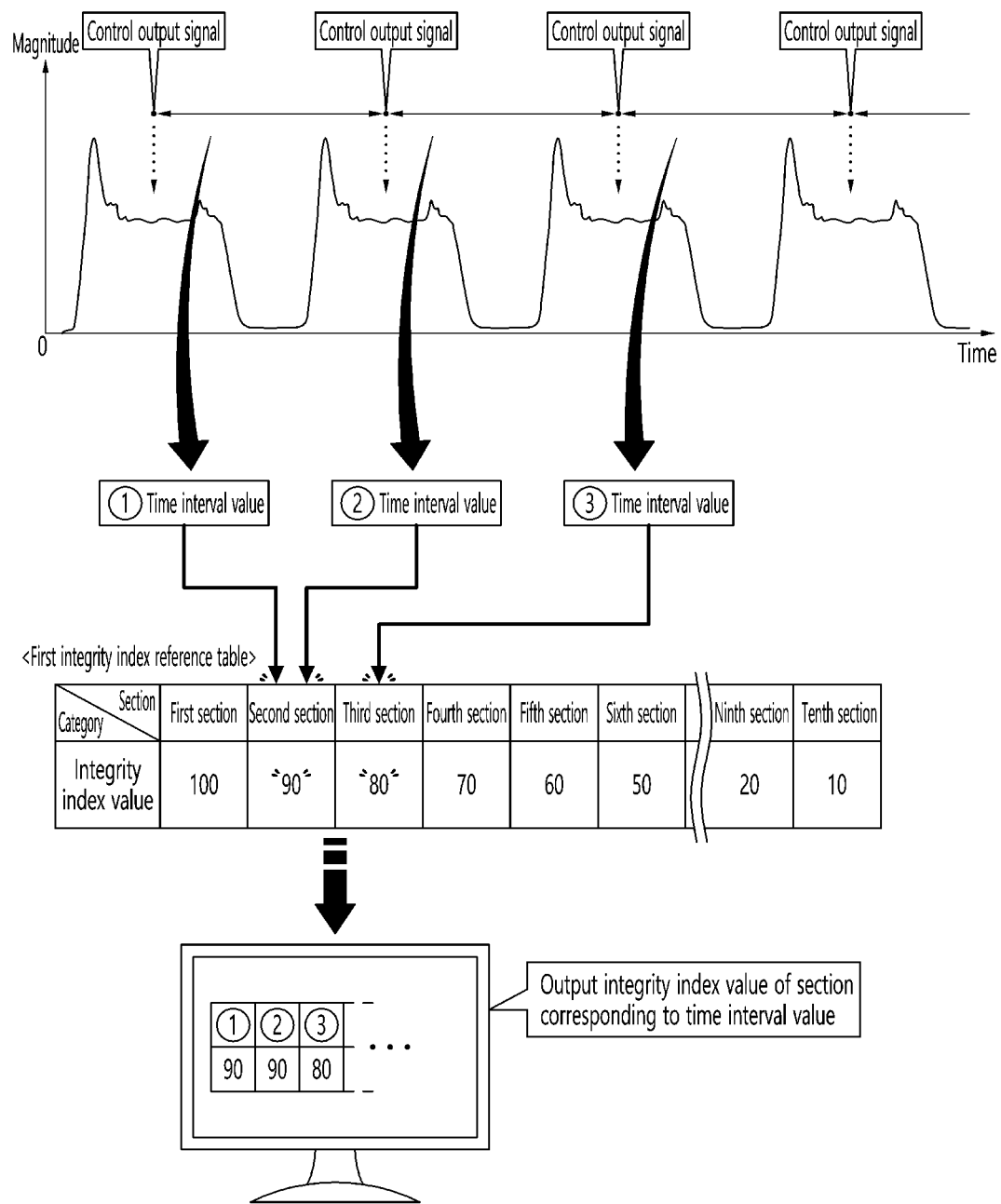

[Fig. 7]
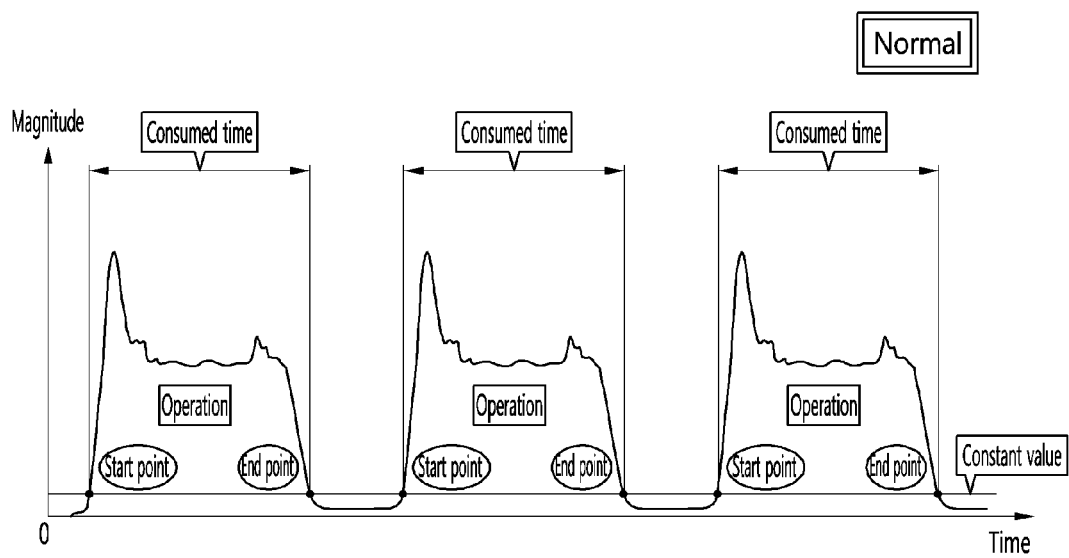

[Fig. 8]
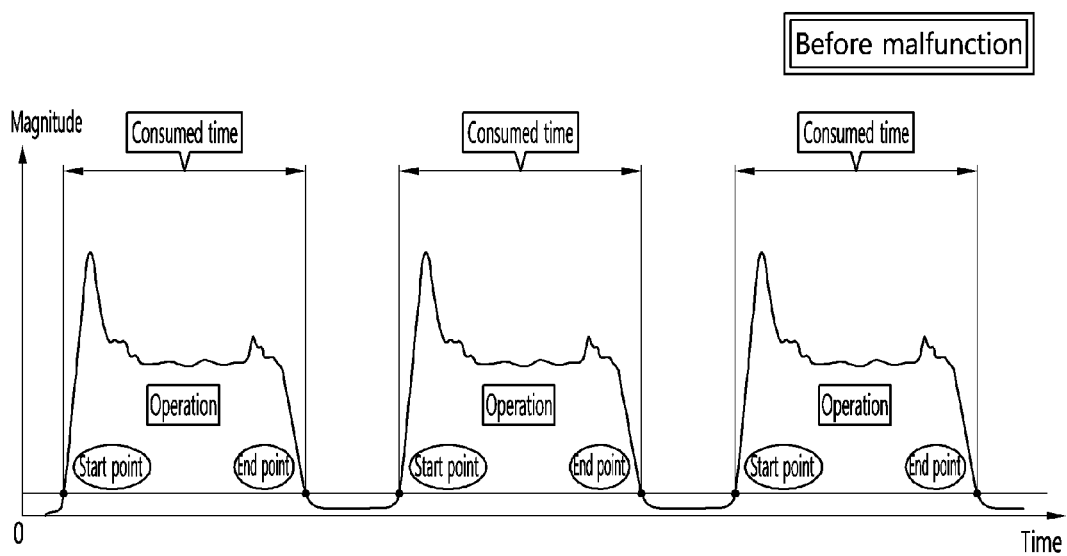

[Fig. 9]
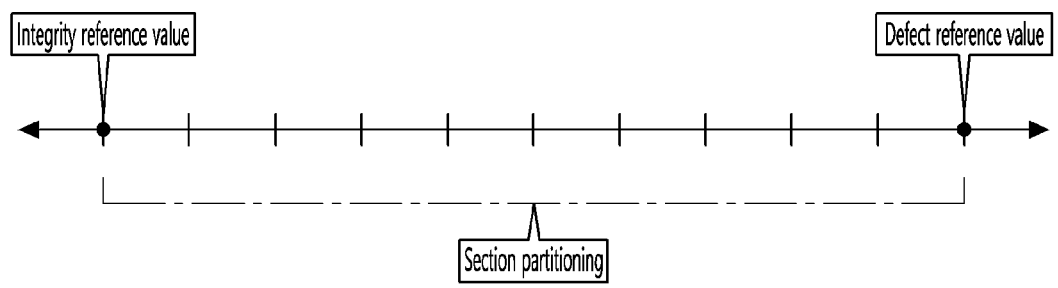

[Fig. 10]
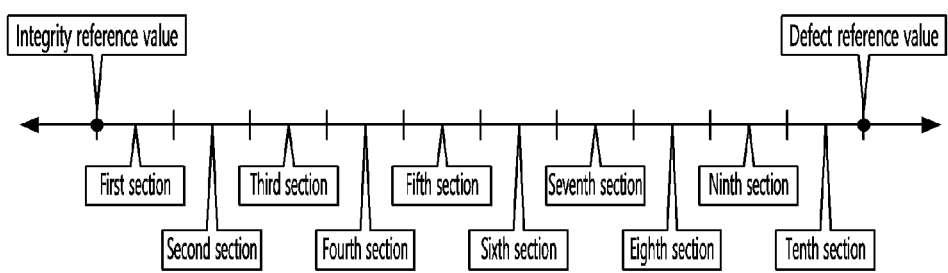

[Fig. 11]
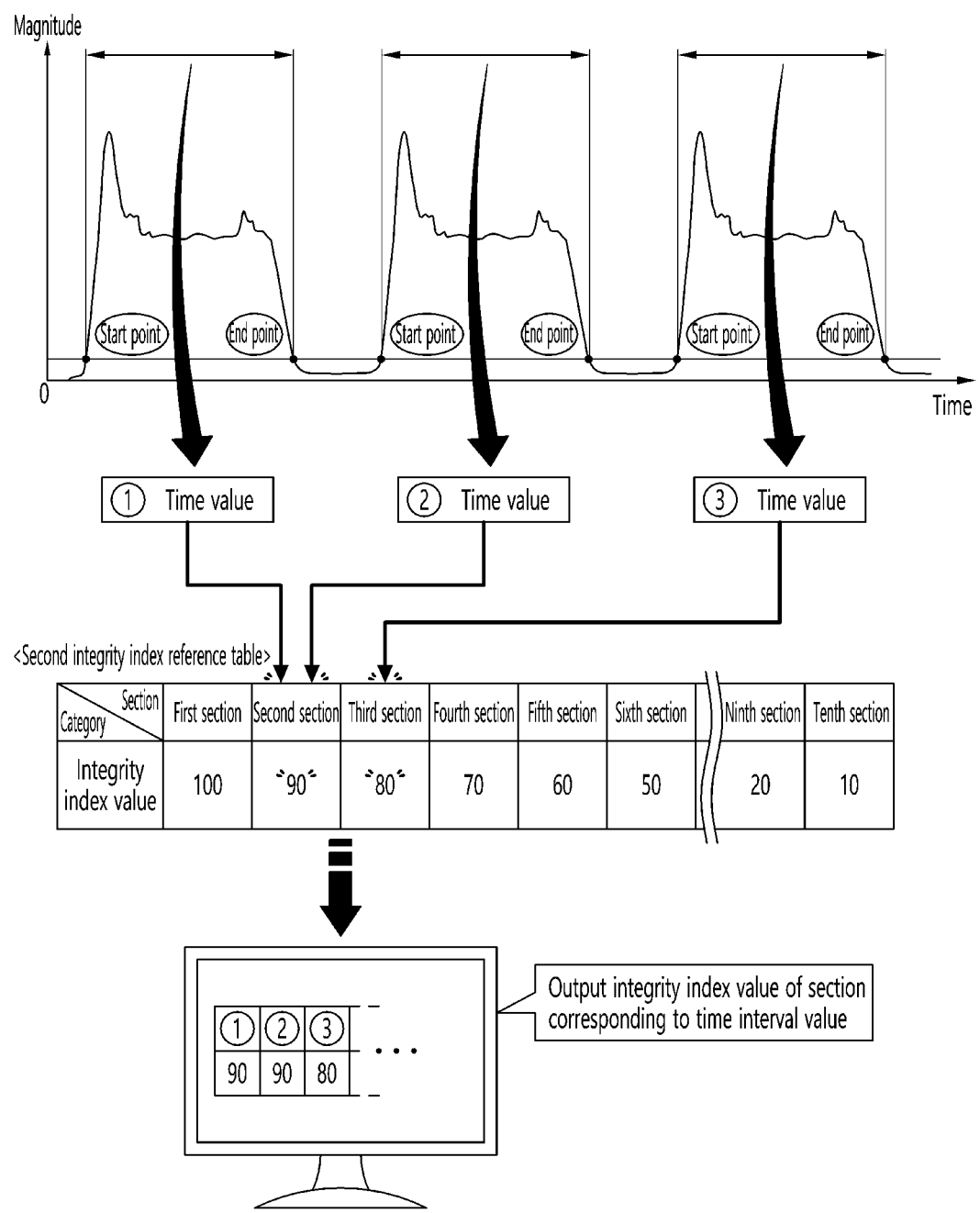

[Fig. 12]
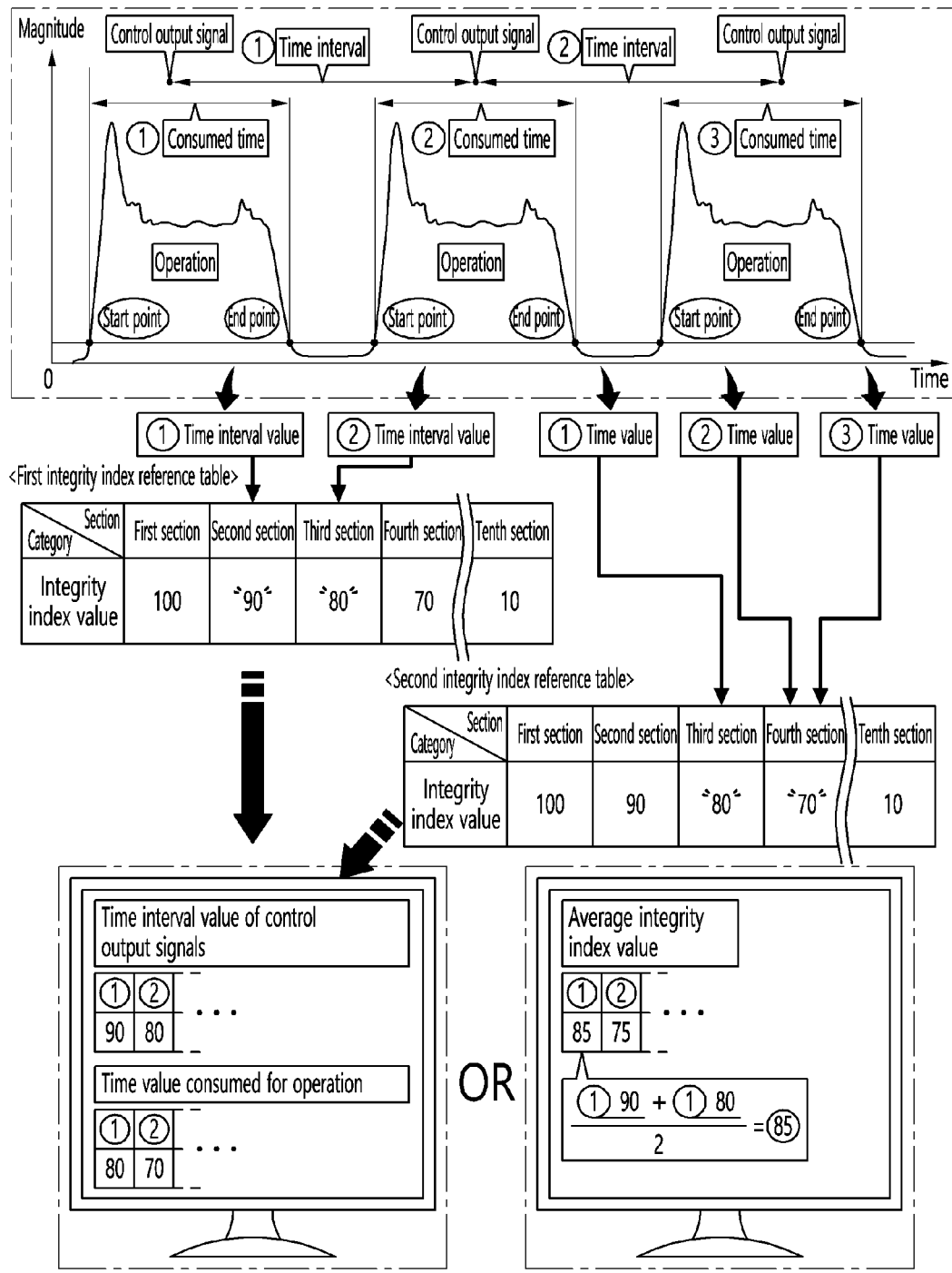

[Fig. 13]
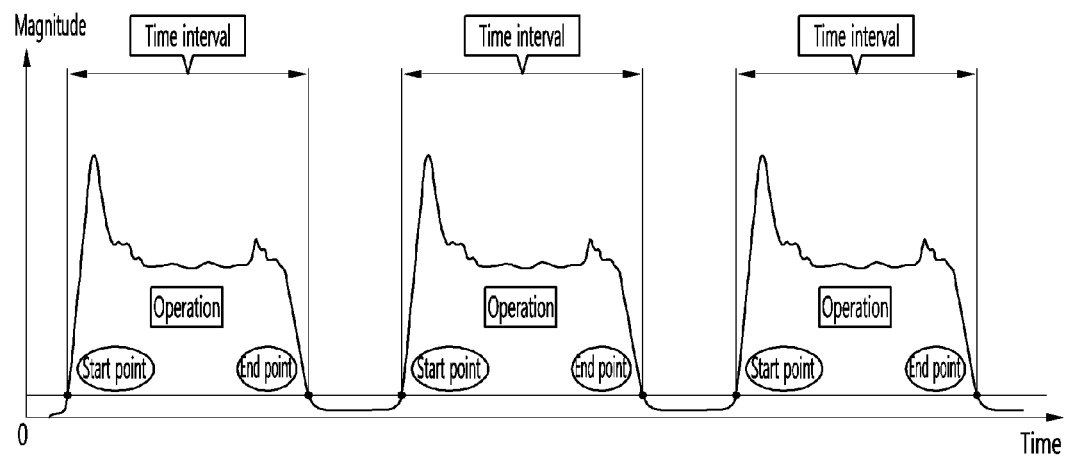

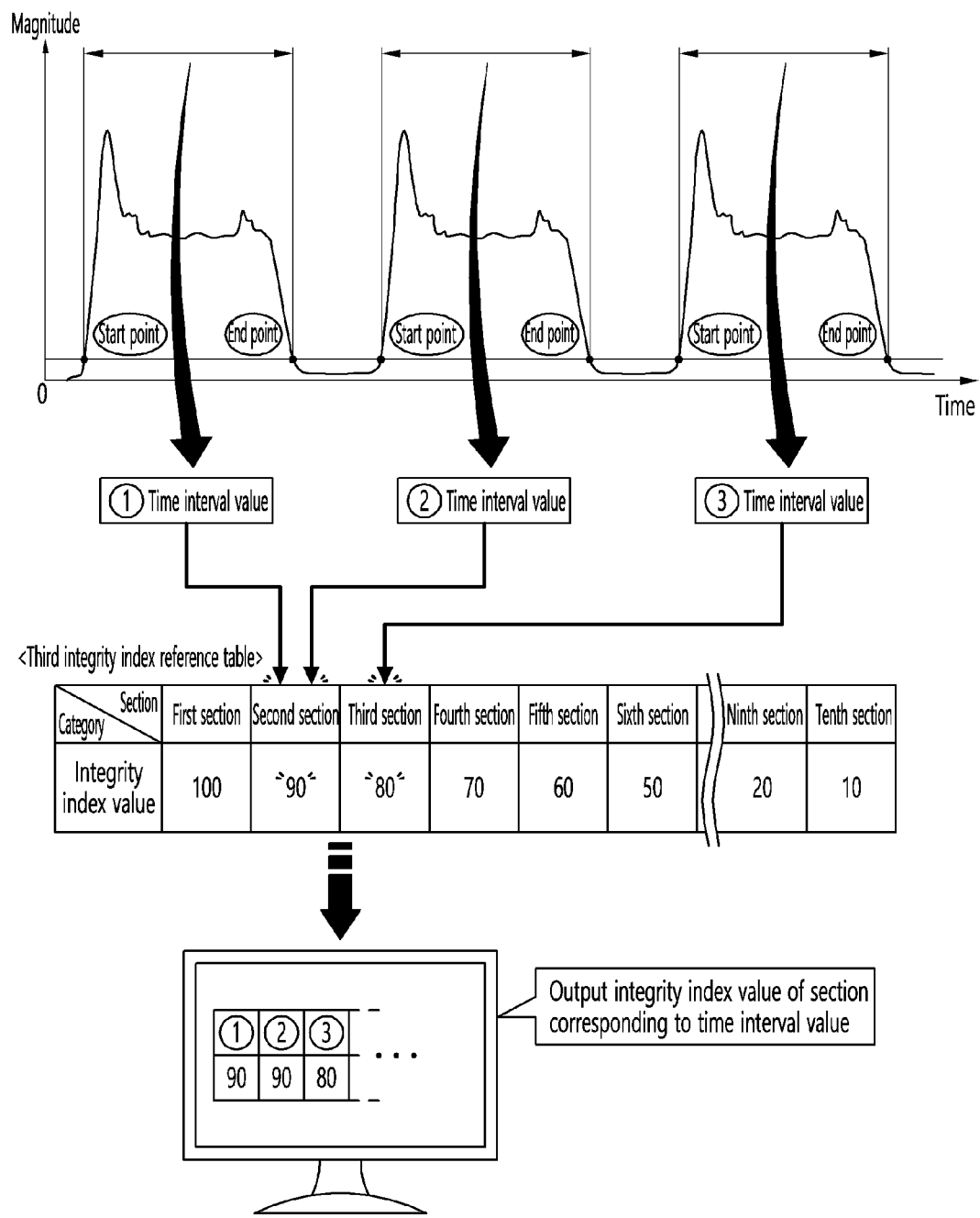
[Fig. 14]

INTEGRITY INDEX DETECTING METHOD FOR DEVICE BY MEANS OF CONTROL OUTPUT SIGNAL

CROSS-REFERENCE TO RELATED APPLICATIONS

The present application is a bypass continuation application of currently pending international application No. PCT/KR2019/017643 having an international filing date of Dec. 12, 2019 and designating the United States, the international application claiming a priority date of Jun. 25, 2019 based upon prior filed K.R patent application No. 10-2019-0075794, the entire contents of the aforesaid international application and the aforesaid K.R. patent application being incorporated herein by reference.

BACKGROUND

The present invention relates to an integrity index detecting method for a device by means of a control output signal, and more particularly, to an integrity index detecting method for a device by means of a control output signal which, after establishing an integrity index reference table based on an integrity reference value set based on information collected from a normal device and a defect reference value set based on information collected from a device before a malfunction occurs, outputs an integrity index value indicating an integrity of the device in real time by applying time information collected from the device in real time to the integrity index reference table to provide the integrity index value to a manager, thereby allowing the manager to clearly recognize a real-time integrity of the device by means of the integrity index to establish a plan for inspection or management of the device by himself to very actively and stably perform the overall management of the device to significantly reduce safety accident and losses of money due to the sudden malfunction of the device.

Generally, a stable operation is very important for various devices used for an automation process of equipment.

For example, dozens or hundreds of devices are installed in the equipment of large-scale production plants to continuously produce products while interlocking with each other. If any one of the plurality of devices is broken, a tremendous situation in which the entire operation of the equipment is stopped may occur.

In this case, due to the down-time caused by the malfunction of the device, a huge loss may be caused by not only the repair cost of the device, but also the operating cost which is wasted while the equipment is stopped and the business effect.

According to the recent data of the Ministry of Employment and Labor and the Korea Occupational Safety and Health Agency, the total number of casualties resulting from annual industry safety accidents is estimated to be about 100,000 and when it is converted into the cost, it is estimated that 18 trillion won is lost annually.

In order to avoid an unexpected down-time cost, there is an urgent need for a method of providing information about a real-time state of the device to the manager to induce efficient management of the device by performing the inspection and the repair in advance before the malfunction of the device occurs.

SUMMARY OF INVENTION

The present invention is proposed to solve various problems described above and an object thereof is to provide an integrity index detecting method for a device by means of a control output signal which after establishing an integrity index reference table based on an integrity reference value set based on information collected from a normal device and a defect reference value set based on information collected from a device before a malfunction occurs, outputs an integrity index value indicating an integrity of the device in real time by applying time information collected from the device in real time to the integrity index reference table to provide the integrity index value to a manager, thereby allowing the manager to clearly recognize a real-time integrity of the device by means of the integrity index to establish a plan for inspection or management of the device by himself to very actively and stably perform the overall management of the device to significantly reduce safety accident and losses of money due to the sudden malfunction of the device.

Further, an object of the present invention is to provide an integrity index detecting method for a device by means of a control output signal which not only very precisely detects an integrity of the device, but also ensures an excellent reliability for the detected integrity of the device by presenting various detecting conditions for searching for an integrity in the device and detecting the integrity of the device based on the detecting conditions.

In order to achieve the above-described objects, an integrity index detecting method for a device by means of a control output signal according to the present invention includes an integrity information collecting step S10 of measuring and collecting a time interval between a control output signal and a subsequent control output signal which are output from a controller to allow a device which operates with a control output signal output from the controller to repeat an operation in a normal state; a defect information collecting step S20 of measuring and collecting a time interval between a control output signal and a subsequent control output signal which are output from the controller to allow the device which operates with the control output signal output from the controller to repeat the operation in a state before a malfunction of a device occurs; a setting step S30 of setting an integrity reference value and a defect reference value for the time interval between the control output signals based on the time interval information between the control output signals collected in the integrity information collecting step S10 and the defect information collecting step S20; a detecting step S40 of measuring and collecting the time interval value between a control output signal and a subsequent control output signal which are output from the controller to repeatedly perform an operation of the device in real time and detecting an integrity index value of the device by comparing the collected time interval value and the integrity and defect reference values set in the setting step S30; and an outputting step S50 of outputting the integrity index value detected in the detecting step S40 to provide the integrity index value to the manager.

The detecting step S40 includes: a partitioning procedure S41 of partitioning a section between the integrity reference value and the defect reference value for the time interval between the control output signals set in the setting step S30 into at least two sections; a setting procedure S42 of setting a section partitioned between the integrity reference value and the defect reference value to a first section, a second section, . . . , and an n-th section sequentially from the integrity reference value and establishing a first integrity index reference table by setting an integrity index value for each section; and a detecting procedure S43 of applying the time interval value between the control output signals measured and collected in the device in real time to the integrity index reference table to detect a section corresponding to the measured time interval value and extract the integrity index value of the detected section.

In the integrity information collecting step S10 and the defect information collecting step S20, a time consumed from a start time of one operation to an end time in a device which receives a control output signal output from the controller to operate may be further measured and collected.

In the setting step S30, an integrity reference value and a defect reference value for the time consumed for one operation of the device may be set based on time information consumed for one operation of the device collected in the integrity information collecting step S10 and the defect information collecting step S20.

In the detecting step S40, a time value consumed from a start time of an operation of the device to an end time are measured and collected in real time and an integrity index value of the device is detected by comparing the collected time value and the integrity reference values and defect reference values for a time consumed for one operation set in the setting step S30.

The detecting step S40 includes: a partitioning procedure S41 of partitioning a section between the integrity reference value and the defect reference value for the time consumed for one operation of the device set in the setting step S30 into at least two sections; a setting procedure S42 of setting a section partitioned between the integrity reference value and the defect reference value for a time consumed for one operation of the device to a first section, a second section, . . . , and an n-th section sequentially from the integrity reference value and at the same time establishing a second integrity index reference table by setting an integrity index value for each section; and a detecting procedure S43 of applying the time value consumed for one operation measured and collected in the device in real time to the second integrity index reference table to detect a section corresponding to the measured time value and extract the integrity index value of the detected section.

In the outputting step S50, an integrity index value for a time value consumed for one operation of the device which is detected in real time and an integrity index value for a time interval value between the control output signals transmitted to the device may be independently output.

In the detecting step S40, an average for an integrity index value for a time value consumed for one operation of the device which is detected in real time and an integrity index value for a time interval value between the control output signals transmitted to the device is calculated to be detected as one average integrity index value and in the outputting step S50, the one average integrity index value may be solely output.

Instead of measuring and collecting the time interval between the control output signal and the subsequent control output signal which are repeatedly output from the controller, in the integrity information collecting step S10 and the defect information collecting step S20, a time interval from a time when one operation starts in the device to a time when a subsequent operation starts may be further measured and collected.

In the setting step S30, the integrity reference value and the defect reference value for the time interval between times of starting one operation and a subsequent operation of the device may be set based on the time interval information between a start time of one operation of the device and a start time of a subsequent operation collected in the integrity information collecting step S10 and the defect information collecting step S20.

In the detecting step S40, a time interval value between a time when one operation of the device starts and a time when a subsequent operation starts is measured and collected in real time, and the collected time interval value and the integrity reference values and the defect reference values for the time interval between the start times of one operation of the device and a subsequent operation set in the setting step S30 are compared to detect the integrity index value of the device.

In the detecting step S40, a third integrity index reference table for a time interval between start times of one operation of the device and a subsequent operation is established, a time interval value between a time when one operation of the device starts and a time when a subsequent operation starts is measured and collected in real time, and the collected time interval value is applied to the third integrity index reference table to detect an integrity index value of the device.

As described above, according to the present invention, after establishing an integrity index reference table based on an integrity reference value set based on information collected from a normal device and a defect reference value set based on information collected from a device before a malfunction occurs, an integrity index detecting method for a device by means of s control output signal outputs an integrity index value indicating an integrity of the device in real time by applying time information collected from the device in real time to the integrity index reference table to provide the integrity index value to a manager, thereby allowing the manager to clearly recognize a real-time integrity of the device by means of the integrity index to establish a plan for inspection or management of the device by himself to very actively and stably perform the overall management of the device to significantly reduce safety accident and losses of money due to the sudden malfunction of the device.

Further, the integrity index detecting method not only very precisely detects an integrity of the device, but also ensures an excellent reliability for the detected integrity of the device by presenting various detecting conditions for searching for an integrity in the device and detecting the integrity of the device based on the detecting conditions.

DESCRIPTION OF DRAWINGS

FIG. 1 is a flowchart of an integrity index detecting method for a device by means of a control output signal according to an exemplary embodiment of the present invention.

FIG. 2 illustrates a time interval between a control output signal and a subsequent control output signal output from a controller to repeatedly perform an operation in a normal state of the device, according to an exemplary embodiment of the present invention.

FIG. 3 illustrates a time interval between a control output signal and a subsequent control output signal output from a controller to repeatedly perform an operation in a state of the device before a malfunction occurs, according to an exemplary embodiment of the present invention.

FIG. 4 illustrates a state in which a section between an integrity reference value and a defect reference value is partitioned, according to an exemplary embodiment of the present invention.

FIG. 5 illustrates a first integrity index reference table established by setting an integrity index value for every section, according to an exemplary embodiment of the present invention.

FIG. 6 illustrates a procedure of extracting an integrity index value using a first integrity index reference table, according to an exemplary embodiment of the present invention.

FIG. 7 illustrates a time consumed from a start time of one operation to an end time in a normal state of a device which receives a control output signal output from a controller to operate, according to another exemplary embodiment of the present invention.

FIG. 8 illustrates a time consumed from a start time of one operation to an end time in a device which receives a control output signal output from a controller to operate in a state before a malfunction occurs, according to another exemplary embodiment of the present invention.

FIG. 9 illustrates a state in which a section between an integrity reference value and a defect reference value for a time consumed for one operation of a device is partitioned, according to another exemplary embodiment of the present invention.

FIG. 10 illustrates a second integrity index reference table established by setting an integrity index value for every section, according to another exemplary embodiment of the present invention.

FIG. 11 illustrates a procedure of extracting an integrity index value using a second integrity index reference table, according to another exemplary embodiment of the present invention.

FIG. 12 illustrates procedures of extracting and outputting an integrity index value using a first integrity index reference table and a second integrity index reference table, according to another exemplary embodiment of the present invention.

FIG. 13 measures a time interval from a start time of one operation of a device to a start time of a subsequent operation, according to another exemplary embodiment of the present invention.

FIG. 14 illustrates a procedure of extracting an integrity index value using a third integrity index reference table, according to another exemplary embodiment of the present invention.

DETAILED DESCRIPTION

An integrity index detecting method for a device by means of a control output signal according to an exemplary embodiment of the present invention will be described in detail based on the accompanying drawings. A detailed description of known functions and configurations determined to unnecessarily obscure the gist of the present invention will be omitted.

FIG. 1 is a flowchart of an integrity index detecting method for a device by means of a control output signal according to an exemplary embodiment of the present invention.

As illustrated in FIG. 1, the integrity index detecting method 100 for a device by means of a control output signal according to an exemplary embodiment of the present invention includes a first integrity information collecting step S10, a defect information collecting step S20, a setting step S30, a detecting step S40, and an outputting step S50.

The integrity information collecting step S10 is a step of measuring and collecting a time interval between a control output signal and a subsequent control output signal which are output from the controller to allow a device which operates with a control output signal output from the controller to repeat an operation in a normal state.

FIG. 2 illustrates a time interval between a control output signal and a subsequent control output signal output from a controller to repeatedly perform an operation in a normal state of the device, according to an exemplary embodiment of the present invention.

Generally, in order to allow the device to repeatedly perform the operation, the device needs to receive a repetitive control output signal from the controller to perform the operation. As illustrated in FIG. 2, in the integrity information collecting step S10, a time interval between the control output signals which are received from the controller to repeatedly perform the operation in a normal state of the device is collected and the time interval information between the control output signals collected as described above becomes a basis of an integrity reference value set to detect the integrity of the device in the setting step S30 to be described below.

FIG. 2 illustrates a drilling machine in a normal state which repeatedly performs an operation of continuously drilling holes by receiving a control output signal output from the controller and a waveform illustrated in FIG. 2 illustrates an energy (power) value consumed during the process of performing an operation by the device over time.

FIG. 3 illustrates a time interval between a control output signal and a subsequent control output signal output from a controller to repeatedly perform an operation in a state of the device before a malfunction occurs, according to an exemplary embodiment of the present invention.

As illustrated in FIG. 3, the defect information collecting step S20 is a step of measuring and collecting a time interval between a control output signal and a subsequent control output signal which are output from the controller to allow the device which operates with the control output signal output from the controller to repeat the operation in a state before a malfunction of a device occurs.

As described above, the time interval information between the control output signals measured and collected in the defect information collecting step S20 becomes a basis of a defect reference value set to detect the integrity of the device in the setting step S30.

It is understood that the time interval between the control output signals output from the controller to control the operation of the device illustrated in FIG. 3 is longer than the time interval between the control output signals output from the controller to control an operation of the device illustrated in FIG. 2. By doing this, it is assumed that the worse the state of the device, the longer the time consumed for an operation performed by the device so that the time between the control output signals output from the controller is also naturally increased.

The setting step S30 is a step of setting an integrity reference value and a defect reference value for the time interval between the control output signals based on the time interval information between the control output signals collected in the integrity and defect information collecting steps S10 and S20.

Here, the integrity reference value is set based on the time interval information between the control output signals collected in the integrity information collecting step S10 and the defect reference value is set based on the time interval values which abnormally change (increase) before the malfunction of the device occurs based on the time interval information between the control output signals collected in the defect information collecting step S20.

In the detecting step S40, the time interval value between a control output signal and a subsequent control output signal which are output from the controller to repeatedly perform an operation of the device is measured and collected in real time and the integrity index value of the device is detected by comparing the collected time interval value and the integrity and defect reference values set in the setting step S30. The detecting step is configured by a partitioning procedure S41, a setting procedure S42, and a detecting procedure S43.

The partitioning procedure S41 is a procedure of partitioning a section between the integrity reference value and the defect reference value for the time interval between the control output signals set in the setting step S30 into at least two sections.

FIG. 4 illustrates a state in which a section between an integrity reference value and a defect reference value is partitioned, according to an exemplary embodiment of the present invention.

As illustrated in FIG. 4, there is a (magnitude) difference between the integrity reference value and the defect reference value and a section between the integrity reference value and the defect reference value is formed by the difference and this section is partitioned into two or more sections with the same interval.

Here, when the section between the integrity reference value and the defect reference value is partitioned, the number of times of partitioning of the section is set depending on how precisely detect the integrity of the device in the detecting procedure S43 to be described below. For example, as compared with the partitioning between the integrity reference value and the defect reference value into 10 sections, when the section between the integrity reference value and the defect reference value is partitioned into 100 sections, the integrity of the device may be more precisely detected.

In the integrity index detecting method 100 for a device by means of the control output signal of the present invention, the section between the integrity reference value and the defect reference value is partitioned into 10 sections, but the number of partitioned sections is not limited thereto.

The setting procedure S42 is a procedure of setting a section partitioned between the integrity reference value and the defect reference value to a first section, a second section, . . . , and an n-th section sequentially from the integrity reference value and at the same time establishing a first integrity index reference table by setting an integrity index value for each section.

FIG. 5 illustrates a first integrity index reference table established by setting an integrity index value for every section, according to an exemplary embodiment of the present invention.

As illustrated in FIG. 5, in the partitioning procedure S41, when the section between the integrity reference value and the defect reference value is partitioned into 10 sections, the partitioned sections are set as a first section, a second section, . . . , and a tenth section from the integrity reference value and then an integrity index value for each section is set to establish the first integrity index reference table. In the integrity index detecting method 100 for a device by means of a control output signal of the present invention, the integrity index value is limited to the range from minimum 10 to maximum 100, the limited integrity index value is assigned to each section to detect the integrity of the device.

Here, the integrity index value is limited to the range of 10 to 100 and when a value of the integrity index is large, a state of the device is set to be sound and when the value of the integrity index is small, the state of the device is set to be defective. However, the limiting and setting of the range of the integrity index value are arbitrarily determined as an example and the integrity index value may be determined to various ranges and settings.

The detecting procedure S43 is a procedure of applying the time interval value between the control output signals measured and collected in the device in real time to a first integrity index reference table to detect a section corresponding to the measured time interval value and extract the integrity index value of the detected section.

FIG. 6 illustrates a procedure of extracting an integrity index value using a first integrity index reference table, according to an exemplary embodiment of the present invention.

As illustrated in FIG. 6, a time interval value between the control output signals output from the controller to control the operation of the device is measured and collected in real time, and the measured time interval value is applied to the first integrity index reference table to detect a corresponding section and extract (acquire) an integrity index value corresponding to the detected section.

The outputting step S50 is a step of outputting the integrity index value of the device detected in the detecting step S40 to provide the integrity index value to the manager.

That is, when the integrity index value of the device is extracted in real time through the procedures of the detecting step S40, the extracted integrity index value is output to a normal monitor as an image to induce the manager to clearly recognize the integrity state of the device to effectively handle (inspect/repair) according to the integrity of the device.

FIG. 7 illustrates a time consumed from a start time of one operation to an end time in a normal state of a device which receives a control output signal output from a controller to operate, according to another exemplary embodiment of the present invention.

FIG. 8 illustrates a time consumed from a start time of one operation to an end time in a device which receives a control output signal output from a controller to operate in a state before a malfunction occurs, according to another exemplary embodiment of the present invention.

As illustrated in FIGS. 7 and 8, in the integrity and defect information collecting steps S10 and S20, a time consumed from a time when one operation starts to a time when the operation ends in the device which receives a control output signal output from the controller to operate may be further measured and collected.

In the waveform illustrated in FIGS. 7 and 8, a time when an energy value is increased to be more than a predetermined value which is arbitrarily set is set as a start time of an operation and a time when the energy value is decreased to be less than a predetermined value is set as an end time to measure and collect a time consumed for one operation, but the method of measuring the time consumed for the operation of the device is not limited thereto.

In the setting step S30, an integrity reference value and a defect reference value for the time consumed for one operation of the device are set based on time information consumed for one operation of the device collected in the integrity and defect information collecting steps S10 and S20.

In the detecting step S40, a time value consumed from a start time of an operation of the device to an end time are measured and collected in real time and an integrity index value of the device is detected by comparing the collected time value and the integrity reference values and defect reference values for a time consumed for one operation set in the setting step S30.

FIG. 9 illustrates a state in which a section between an integrity reference value and a defect reference value for a time consumed for one operation of a device is partitioned, according to another exemplary embodiment of the present invention.

As illustrated in FIG. 9, in the partitioning procedure S41, a section between the integrity reference value and the defect reference value for the time consumed for one operation of the device set in the setting step S30 is partitioned into at least two sections.

FIG. 10 illustrates a second integrity index reference table established by setting an integrity index value for every section, according to another exemplary embodiment of the present invention.

As illustrated in FIG. 10, in the setting procedure S42, a section partitioned between the integrity reference value and the defect reference value for the time consumed for one operation of the device is set to a first section, a second section, . . . , and an n-th section sequentially from the integrity reference value and at the same time a second integrity index reference table is established by setting an integrity index value for each section.

Here, for the convenience of description, in the second integrity index reference table, the section is partitioned in the same way as the first integrity index reference table to set the integrity index value. However, the second integrity index table may also be set by various sections and integrity index values like the first integrity index reference table.

FIG. 11 illustrates a procedure of extracting an integrity index value using a second integrity index reference table, according to another exemplary embodiment of the present invention.

As illustrated in FIG. 11, in the detecting procedure S43, the time value consumed for one operation measured and collected in the device in real time is applied to the second integrity index reference table to detect a section corresponding to the measured time value and extract the integrity index value of the detected section.

The integrity index value is output in the outputting step S50 so that the manager is induced to clearly recognize an integrity state of the device to effectively manage the device according to the integrity of the device.

FIG. 12 illustrates procedures of extracting and outputting an integrity index value using a first integrity index reference table and a second integrity index reference table, according to another exemplary embodiment of the present invention.

Referring to FIG. 12, in the detecting step S40, the integrity index value of the device by the second integrity index reference table to which a time value consumed for one operation of the device detected in real time is applied and the integrity index value of the device by the first integrity index reference table to which the time interval value between the control output signals transmitted to the device is applied are detected, respectively, the integrity index values are to be independently output through the outputting step S50 or an average of the detected integrity index values is calculated to be detected as one average integrity index value to be solely output through the outputting step S50 to be provided to the manager.

That is, the integrity of the device is detected in various methods to ensure an excellent reliability for the detected integrity of the device and the detection result for the integrity of the device is output in various methods according to the environment (condition) in which the device is operated so that the usage versatility of the integrity index detecting method of the present invention may be ensured.

FIG. 13 measures a time interval from a start time of one operation of a device to a start time of a subsequent operation, according to another exemplary embodiment of the present invention.

As illustrated in FIG. 13, instead of measuring and collecting the time interval between the control output signal and the subsequent control output signal which are repeatedly output from the controller, in the integrity and defect information collecting steps S10 and S20, a time interval from a time when one operation starts in the device to a time when a subsequent operation starts is measured and collected.

In the setting step S30, the integrity reference value and the defect reference value for the time interval between times of starting one operation and a subsequent operation of the device are set based on the time interval information between a start time of one operation of the device and a start time of a subsequent operation collected in the integrity and defect information collecting steps S10 and S20.

FIG. 14 illustrates a procedure of extracting an integrity index value using a third integrity index reference table, according to another exemplary embodiment of the present invention.

As illustrated in FIG. 14, in the detecting step S40, a time interval value between a time when one operation of the device starts and a time when a subsequent operation starts is measured and collected in real time and the collected time interval value and the integrity reference values and the defect reference values for the time interval between the start times of one operation of the device and a subsequent operation set in the setting step S30 are compared to detect the integrity index value of the device.

In the detecting step S40, instead of the first integrity index reference table, a third integrity index reference table for the time interval between start times of one operation of the device and a subsequent operation is established by means of the partitioning procedure S41 and the setting procedure S42, and in the detecting procedure S43, a time interval value between a time when one operation of the device starts and a time when a subsequent operation starts is measured and collected in real time, and the collected time interval value is applied to the third integrity index reference table to detect an integrity index value of the device.

Here, a method of establishing the third integrity index reference table based on the time interval value between the time when one operation starts and the time when a subsequent operation starts is the same as the above-described method for the first and second integrity index reference tables, so that a detailed description thereof will be omitted.

The integrity index detecting method 100 for a device by means of a control output signal of the present invention which detects the integrity of the device by the above-described procedure, after establishing an integrity index reference table based on an integrity reference value set based on information collected from a normal device and a defect reference value set based on information collected from a device before a malfunction occurs, outputs an integrity index value indicating an integrity of the device in real time by applying time information collected from the device in real time to the integrity index reference table to provide the integrity index value to a manager, thereby allowing the manager to clearly recognize a real-time integrity of the device by means of the integrity index to establish a plan for inspection or management of the device by himself to very actively and stably perform the overall management of the device to significantly reduce safety accident and losses of money due to the sudden malfunction of the device.

Further, the integrity index detecting method not only very precisely detects an integrity of the device, but also ensures an excellent reliability for the detected integrity of the device by presenting various detecting conditions for searching for an integrity in the device and detecting the integrity of the device based on the detecting conditions.

Although the integrity index detecting method 100 for a device by means of a control output signal has been described based on the control output signal output from the controller to the device, when the technique is described based on a control input signal which is output from the controller to be input to the device, the same effect may also be expected.

The present invention has been described with reference to the exemplary embodiment illustrated in the drawing, but the exemplary embodiment is only illustrative and the present invention is not limited thereto. Further, it would be appreciated by those skilled in the art that various modifications and equivalent exemplary embodiments may be made. Further, those skilled in the art may modify the present invention without departing from the spirit of the present invention. Accordingly, the scope of claiming the rights of the present invention is not defined within the scope of the detailed description, but may be limited by the following claims and the technical spirit thereof.

The present invention is applicable to a stable operation of various devices used for an automation process of equipment.

The invention claimed is:

1. An integrity index detecting method for a device by means of a control output signal, the method comprising:
   an integrity information collecting step of measuring and collecting a time interval between a control output signal and a subsequent control output signal which are output from a controller to allow a device which operates with a control output signal output from the controller to repeat an operation in a normal state;
   a defect information collecting step of measuring and collecting a time interval between a control output signal and a subsequent control output signal which are output from the controller to allow the device which operates with the control output signal output from the controller to repeat the operation in a state before a malfunction of the device occurs;
   a setting step of setting an integrity reference value and a defect reference value for the time interval between the control output signals based on the time interval information between the control output signals collected in the integrity information collecting step and the defect information collecting step;
   a detecting step of measuring and collecting the time interval value between a control output signal and a subsequent control output signal which are output from the controller to repeatedly perform an operation of the device in real time and detecting an integrity index value of the device by comparing the collected time interval value and the integrity and defect reference values set in the setting step; and
   an outputting step of outputting the integrity index value detected in the detecting step to provide the integrity index value to a manager, wherein the detecting step includes:
   a partitioning procedure of partitioning a section between the integrity reference value and the defect reference value for the time interval between the control output signals set in the setting step into at least two sections;
   a setting procedure of setting the section partitioned between the integrity reference value and the defect reference value to a first section, a second section, . . . , and an n-th section sequentially from the integrity reference value and establishing a first integrity index reference table by setting the integrity index value for each section; and
   a detecting procedure of applying the time interval value between the control output signals measured and collected in the device in real time to the first integrity index reference table to detect a section corresponding to the measured time interval value and extract the integrity index value of the detected section.

2. The integrity index detecting method of claim 1, wherein in the integrity information collecting step and the defect information collecting step, a time consumed from a start time of one operation to an end time in the device which receives the control output signal output from the controller to operate is further measured and collected.

3. The integrity index detecting method of claim 2, wherein in the setting step, the integrity reference value and the defect reference value for the time consumed for one operation of the device is set based on time information consumed for one operation of the device collected in the integrity information collecting step and the defect information collecting step.

4. The integrity index detecting method of claim 3, wherein in the detecting step, a time value consumed from a start time of an operation of the device to an end time are measured and collected in real time and the integrity index value of the device is detected by comparing the collected time value and the integrity reference values and the defect reference values for the time consumed for one operation set in the setting step.

5. An integrity index detecting method for a device by means of a control output signal, the method comprising:
   an integrity information collecting step of measuring and collecting a time interval between a control output signal and a subsequent control output signal which are output from a controller to allow a device which operates with a control output signal output from the controller to repeat an operation in a normal state;
   a defect information collecting step of measuring and collecting a time interval between a control output signal and a subsequent control output signal which are output from the controller to allow the device which operates with the control output signal output from the controller to repeat the operation in a state before a malfunction of the device occurs;
   a setting step of setting an integrity reference value and a defect reference value for the time interval between the control output signals based on the time interval information between the control output signals collected in the integrity information collecting step and the defect information collecting step;
   a detecting step of measuring and collecting the time interval value between a control output signal and a subsequent control output signal which are output from the controller to repeatedly perform an operation of the device in real time and detecting an integrity index value of the device by comparing the collected time interval value and the integrity and defect reference values set in the setting step; and an outputting step of outputting the integrity index value detected in the detecting step to provide the integrity index value to a manager, wherein in the integrity information collecting step and the defect information collecting step, a time consumed from a start time of one operation to an end time in the device which receives the control output signal output from the controller to operate is further measured and collected, wherein in the setting step, the integrity reference value and the defect reference value for the time consumed for one operation of the device is set based on time information consumed for one operation of the device collected in the integrity information collecting step and the defect information collecting step, wherein in the detecting step, a time value consumed from a start time of an operation of the device to an end time are measured and collected in real time and the integrity index value of the device is detected by comparing the collected time value and the integrity reference values and the defect reference values for the time consumed for one operation set in the setting step, wherein the detecting step includes:

a partitioning procedure of partitioning a section between the integrity reference value and the defect reference value for the time consumed for one operation of the device set in the setting step into at least two sections;

a setting procedure of setting the section partitioned between the integrity reference value and the defect reference value for the time consumed for one operation of the device to a first section, a second section, . . . , and an n-th section sequentially from the integrity reference value and at the same time establishing a second integrity index reference table by setting the integrity index value for each section; and a detecting procedure of applying the time value consumed for one operation measured and collected in the device in real time to the second integrity index reference table to detect a section corresponding to the measured time value and extract the integrity index value of the detected section.

6. The integrity index detecting method of claim 5, wherein in the outputting step, an integrity index value for the time value consumed for one operation of the device which is detected in real time and an integrity index value for the time interval value between the control output signals transmitted to the device are independently output.

7. The integrity index detecting method of claim 5, wherein in the detecting step, an average for the integrity index value for the time value consumed for one operation of the device which is detected in real time and the integrity index value for the time interval value between the control output signals transmitted to the device is calculated to be detected as one average integrity index value and in the outputting step, the one average integrity index value is solely output.

8. The integrity index detecting method of claim 1, wherein instead of measuring and collecting the time interval between the control output signal and the subsequent control output signal which are repeatedly output from the controller, in the integrity information collecting step and the defect information collecting step, a time interval from a time when one operation starts in the device to a time at which a subsequent operation starts is further measured and collected.

9. The integrity index detecting method of claim 8, wherein in the setting step, the integrity reference value and the defect reference value for the time interval between times of starting one operation and a subsequent operation of the device are set based on the time interval information between a start time of one operation of the device and a start time of a subsequent operation collected in the integrity information collecting step and the defect information collecting step.

10. The integrity index detecting method of claim 9, wherein in the detecting step, a time interval value between a time when one operation of the device starts and a time when a subsequent operation starts is measured and collected in real time and the collected time interval value and the integrity reference values and the defect reference values for the time interval between the start times of one operation of the device and a subsequent operation set in the setting step are compared to detect the integrity index value of the device.

11. The integrity index detecting method of claim 10, wherein in the detecting step, a third integrity index reference table for the time interval between the start times of one operation of the device and a subsequent operation is established, the time interval value between a time when one operation of the device starts and a time when a subsequent operation starts is measured and collected in real time, and the collected time interval value is applied to the third integrity index reference table to detect the integrity index value of the device.

* * * * *